Figure 1:
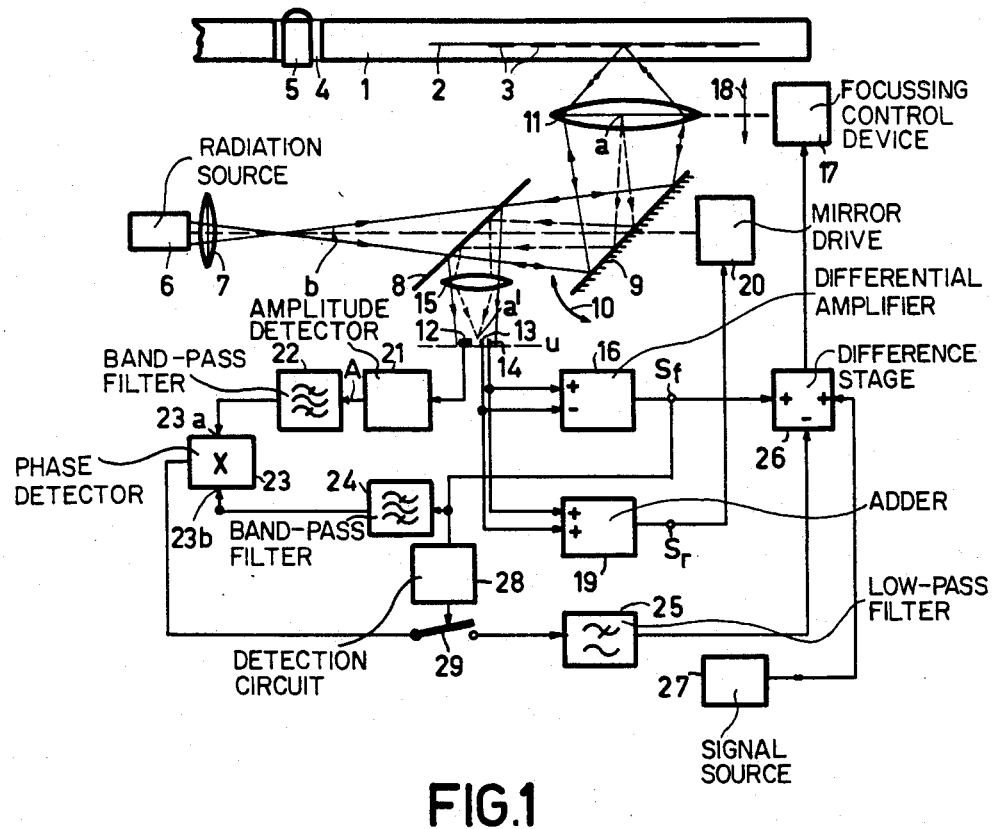

United States Patent [19]

Bierhoff et al.

[11] 4,357,696
[45] Nov. 2, 1982

[54] OPTICAL SCANNING APPARATUS WITH FOCUSSING SYSTEM

[75] Inventors: Martinus P. M. Bierhoff; Kornelis A. Immink, both of Eindhoven, Netherlands

[73] Assignee: U.S. Philips Corporation, New York, N.Y.

[21] Appl. No.: 85,459

[22] Filed: Oct. 17, 1979

[30] Foreign Application Priority Data

Jun. 18, 1979 [NL] Netherlands ............... 7904724

[51] Int. Cl.³ ............................................. G11B 7/12
[52] U.S. Cl. ........................................ 369/45; 250/201
[58] Field of Search ............... 179/100.1 G, 100.3 V; 358/128.5; 250/201; 369/45, 44

[56] References Cited

U.S. PATENT DOCUMENTS

| | | | |
|---|---|---|---|
| 3,833,769 | 9/1974 | Compoon | 369/44 |
| 3,873,763 | 3/1975 | Jonssen | 369/45 |
| 3,876,841 | 4/1975 | Krones | 369/45 |
| 3,876,842 | 4/1975 | Bouwhius | 369/44 |
| 3,952,191 | 4/1976 | Tinet | 250/201 |
| 3,969,576 | 7/1976 | Boonstra | 369/45 |
| 3,992,574 | 11/1976 | Bouwhius | 369/45 |
| 3,992,575 | 11/1976 | Velzel | 369/45 |
| 4,006,293 | 2/1977 | Bouwhius | 179/100.3 V |
| 4,011,400 | 3/1977 | Simons | 369/44 |
| 4,051,527 | 9/1977 | Broat | 179/100.3 G |
| 4,057,833 | 11/1977 | Broat | 369/44 |
| 4,135,207 | 1/1979 | Greve | 369/45 |
| 4,163,149 | 7/1979 | Sawano | 179/100.1 G |

*Primary Examiner*—Alan Faber
*Attorney, Agent, or Firm*—Thomas A. Briody; Robert T. Mayer; Algy Tamoshunas

[57] ABSTRACT

Disclosed in an apparatus for optically scanning a record carrier in which the scanning beam is focussed on the record carrier by a focussing system. For automatically correcting an incorrect control point of the focussing system, the apparatus is provided with a phase detector to which are applied the focussing error signal generated by the focussing system and a signal corresponding to the amplitude of the information signal being read. The output signal supplied by the phase detector is applied to the focussing system a correction signal so as to automatically correct for an incorrect control point of the focussing system.

9 Claims, 5 Drawing Figures

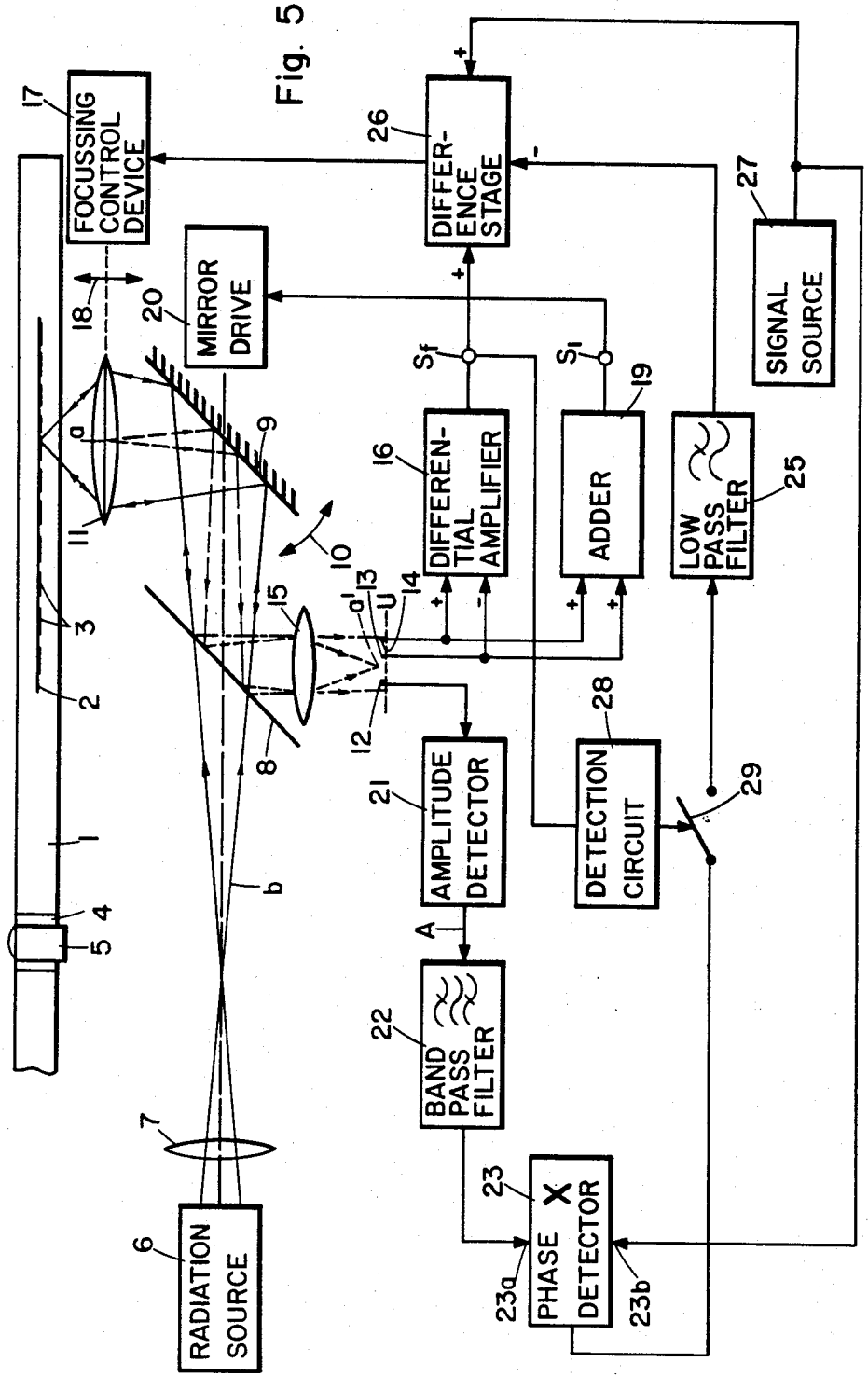

OPTICAL SCANNING APPARATUS WITH FOCUSSING SYSTEM

The invention relates to an apparatus for optically scanning a record carrier on which information is recorded, which apparatus is provided with a radiation source for emitting a scanning beam, a read detector for detecting the information contained in the scanning beam after cooperation with the record carrier and a focussing system for focussing the scanning beam on the record carrier, which focussing system comprises a forcussing detector for supplying a measuring signal which is representative of the extent to which the scanning beam is out of focus on the record carrier and a focussing control device for controlling the focussing of said scanning beam depending on the measuring signal.

Record carriers which are intended to be scanned optically generally comprise a disc which is provided with very narrow substantially concentric information tracks. The information stored in the information tracks is read by a scanning beam which is converged by an objective system. An essential requirement for correct scanning of the information carrier is that the scanning beam is accurately focussed on the plane of the record carrier and remains focussed regardless of any unevenness of said record carrier.

An apparatus of the aforementioned type is for example known from U.S. Pat. No. 4,006,293. This patent also describes a possible embodiment of the focussing system for focussing the scanning beam on the record carrier. This focussing system employs a focussing detector comprising at least two radiation-sensitive detectors which are arranged at a suitably selected position within the radiation beam which results after cooperation with the record carrier. This position has been selected so that the difference between the output signals of the two radiation sensitive detectors is a measure of the extent to which the scanning beam is in focus. This difference signal is applied to the focussing control device, which comprises a drive means with which the objective can be moved in a direction transverse to the plane of the record carrier.

If accurate focussing is to be obtained, this presents the problem that very stringent requirements are imposed both in respect of the positioning of the elements employed for the focussing detector and the accuracies of the electronic circuits for applying the resulting measuring signal to the focussing control device. If for example the positioning of the two radiation-sensitive detectors in a focussing system in accordance with said United States Patent is not entirely correct, the focussing system will operate with a control point that does not correspond to a correctoptimum focussing. The same applies to any incorrect adjustments (in particular offsets) in the electronic circuits. The signal applied to the focussing control device will then be zero at a certain instant, which is normally indicative of the correct focussing of the scanning beam, whilst in reality this is not the case.

It is the object of the invention to solve this problem in a simple manner and to this end the apparatus of the invention is furthermore provided with an amplitude detector, which is coupled to the read detector, for supplying an output signal which represents the amplitude of the information signal read, a phase detector having a first input for receiving a focussing error signal, a second input for receiving the output signal of the amplitude detector, and an output for supplying a correction signal having a polarity which depends on the phase relationship between the signals applied to the two inputs, and a difference stage for subtracting the measuring signal supplied by the focussing detector and the correction signal supplied by the phase detector from each other and supplying the difference signal to the focussing control device.

The apparatus in accordance with the invention electronically detects and corrects an incorrect setting of the focussing system. For this purpose the invention utilizes the specific correlation which exists between the focussing error signal and the amplitude of the information signal read as a function of the focussing as will be explained in more detail in the description with reference to the Figures.

In accordance with a preferred embodiment of the invention the phase detector is constituted by a multiplying circuit, which supplies the product of the signals applied to its two inputs as a correction signal. Preferably, a low-pass filter with a large time constant is then included in the connection between the phase detector (multiplying circuit) and differential amplifier, so that the correction signal which is ultimately applied to the differential amplifier corresponds to the average value of the product signal. A further embodiment of the apparatus in accordance with the invention is characterized in that the phase detector is provided with two converters for converting the focussing error signal and the output signal of the amplitude detector into two square-wave signals, and an exclusive-OR signal circuit having two inputs for receiving the two squarewave signals and an output for supplying the correction signal. This embodiment is based on the recognition that the correction performed in respect of the focussing control need not be of a proportional nature, which enables the said simple embodiment to be obtained.

A further embodiment of the apparatus in accordance with the invention is characterized in that an interrupter switch is included in the connection between the output of the first detector and the difference stage, which switch is controlled by a control circuit which keeps said connection interrupted as long as the focussing system has not yet effected focussing. The presence of the interrupter switch ensures that the correction in respect of the focussing system becomes active only when said focussing system has locked in at its own operating point. If this were not done locking in of the focussing system would proceed less smoothly when the scanning apparatus is put into operation.

Finally, in order to obtain a very reliable correction signal, the apparatus in accordance with the invention may be characterized in that the focussing system is provided with a signal source for generating periodic activating signal and applying said signal to the focussing control device for periodically varying the focussing. This results in a periodic comparatively small variation in the focussing, so that both the measuring signal from the detector and the output signal of the amplitude detector exhibit a variation of predetermined frequency to be used for generating the correction signal. When a disc-shaped record carrier is used this activating signal preferably is a frequency equal to an odd multiple of half the revolution frequency of said record carrier, because such a frequency can readily be discriminated from the signal frequencies normally occurring in the focussing system. Moreover, because of the unambiguous relationship between the activating signal and the focus measuring signal, it is possible to apply said activating signal to the phase detector as focussing error signal.

Figure 4:
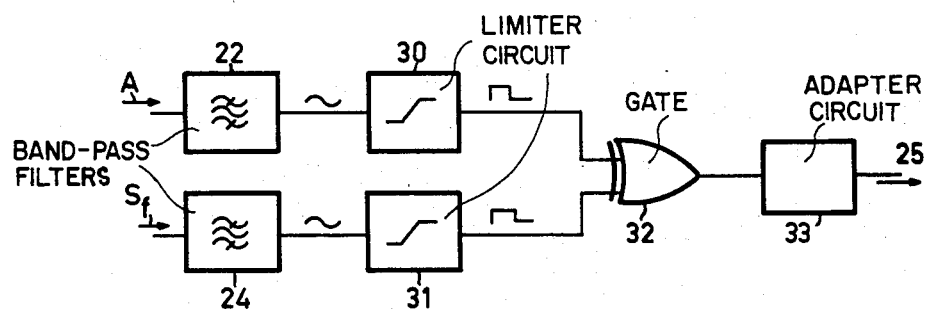
Figure 2:
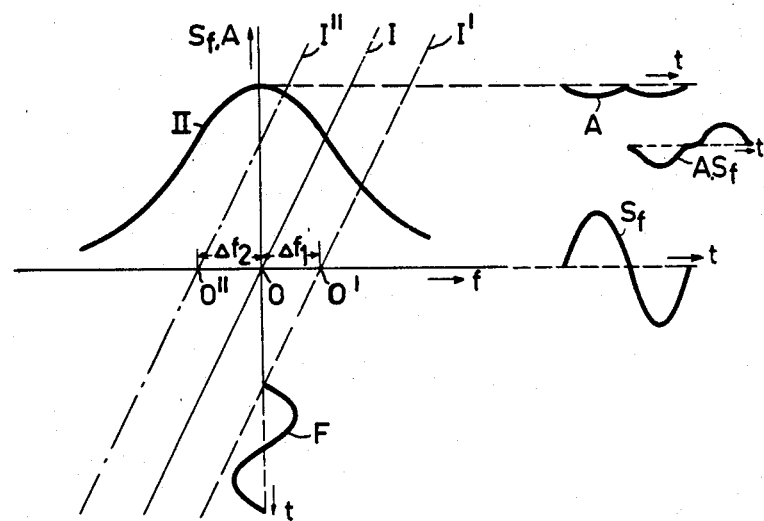
Figure 3:
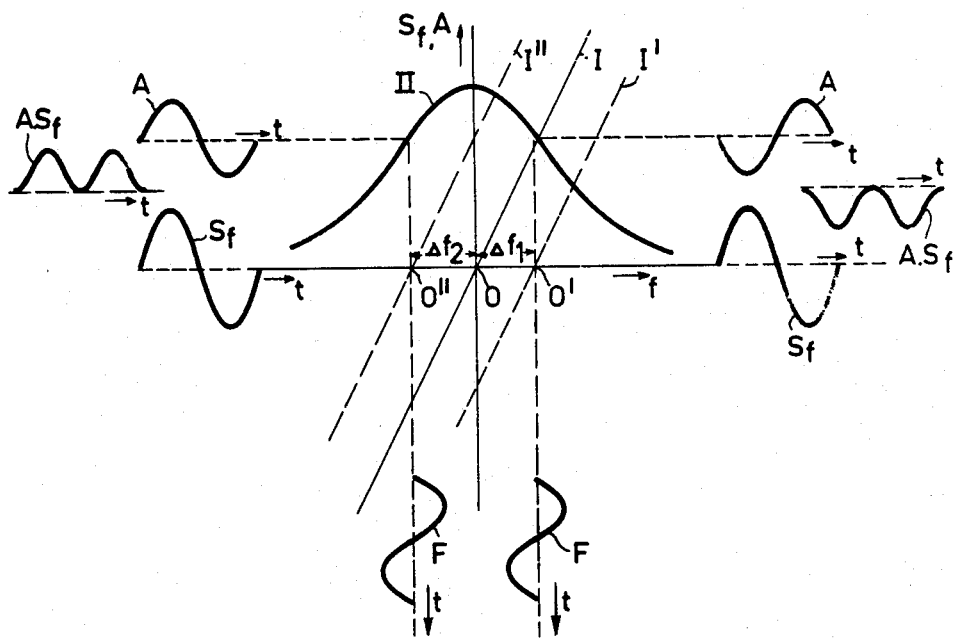

The invention is described in more detail with reference to the Figures, of which FIG. 1 schematically represents an embodiment of the apparatus in accordance with the invention, FIGS. 2 and 3 show characteristics in order to explain the operation of said apparatus, and FIG. 4 shows a simple version of the phase detector required in the apparatus in accordance with the invention.

FIG. 5 schematically shows another embodiment of the apparatus in accordance with the invention.

FIG. 1 shows a disc-shaped record carrier 1, which is rotated by a spindle 5 which extends through a central opening 4. It is assumed that in a plane 2 of the record carrier 1 information tracks 3 are arranged in accordance with a spiral or concentric pattern. Furthermore, it is assumed that the information structure is reflecting.

The scanning apparatus comprises a radiation source 6, for example a helium-neon laser, which via a lens 7 emits a scanning beam b. Said scanning beam b is reflected by a mirror 9 to an objective system 11, which is schematically represented by a single lens. Via this objective system 11 a radiation spot of minimum dimensions is then projected on the plane 2 of the information structure.

The scanning beam is reflected by the information structure and is also modulated by the information stored in the information tracks. The reflected radiation beam again passes through the objective system and is reflected in the direction of the radiation source 6 by the mirror 9. In order to obtain a separation between the unmodulated beam produced by the radiation source and the modulated beam which returns from the record carrier 1 suitable means are included in the radiation path, which for the sake of simplicity are represented by a semitransparent mirror 8 in the Figure. This mirror 8 reflects a part of the modulated scanning beam to a radiation sensitive detector 12, which converts the modulation contained in the scanning beam into an electric signal from which the information stored on the record carrier can be derived by suitable electronic circuits (not shown).

The optical details of the information structure formed on the record carrier 1 are generally very small. As an example, there are record carriers having a spiral information track with a width of 0.6 $\mu$m and a track distance of 1.6 $\mu$m. The information is stored in this information track in the form of a sequence of pits alternating with intermediate areas, the average length of the pits being approximately 2 $\mu$m. If such an information structure is to be read, the scanning spot should remain accurately focussed on the information track 3, whilst moreover the scanning beam should remain sharply focussed on the plane 2 of the information structure.

In order to enable centring and focussing errors to be detected two further radiation sensitive detectors 13 and 14 are provided in addition to the read detector 12. These three detectors are for example arranged in a plane u in which an image of the actual exit pupil of the objective system 11 is formed with the aid of an auxiliary lens 15. For the sake of simplicity FIG. 1 only shows the image a' of a point of the exit pupil. This embodiment of the focussing measuring system corresponds to that disclosed in U.S. Pat. No. 4,006,293.

With the aid of a differential amplifier 16, the output signals of the two radiation sensitive detectors 13 and 14 are subtracted from each other, resulting in a measuring signal $S_f$ which represents the focussing error. As the embodiment of the focussing measuring system as such is of subordinate importance for the invention reference is made, for the description of its operation and the correct positioning of the detectors 13 and 14, to said United States Patent which is incorporated herein by reference. However, the invention is by no means limited to the use of the focussing system disclosed therein, but may also be used in conjunction with any known focussing system. As examples of alternative focussing systems reference is merely made to U.S. Pat. Nos. 3,833,769, 3,876,841, 3,876,842, 3,873,763, 3,992,574, 3,992,575, 3,969,576, 4,011,400, 4,051,527, 4,135,207.

The focussing measuring signal $S_f$ is obtained at the output of the differential amplifier 16 and with the aid of the focussing measuring system is applied to a focussing control device 17, which controls the focussing of the scanning beam. The Figure, which schematically represents an embodiment, shows that said focussing control device 17 comprises a drive means, which controls the distance from the objective 11 to the record carrier 1, i.e. the position of the objective in the direction 18. However, any other focussing device may alternatively be used.

For the sake of completeness the Figure also schematically shows the control system which ensures a correct centring of the scanning spot on the information track. The radial measuring signal $S_r$ required for this control system can be obtained in the present embodiment by adding the output signals of the two radiation sensitive detectors 13 and 14 to each other with the aid of an adder stage 19. As the method of obtaining a radial measuring signal is of subordinate importance for the present invention reference is made to the United States Patent mentioned in the opening paragraph for the description of the operation thereof. Alternative radial measuring systems, as for example described in U.S. Pat. Nos. 3,833,769, 3,876,842, 4,057,833, can equally be used. In the present embodiment the measuring signal $S_r$ produced by the radial measuring system is applied to a drive means 20, which determines the angular position 10 of the mirror 9.

By way of illustration I in FIG. 2 represents the desired characteristic of the focussing measuring signal $S_f$ as a function of the focussing error f. Obviously it is attempted to obtain a linear characteristic over a maximum range around the desired control point O, corresponding to the situation in which the scanning beam is in focus on the plane of the information structure. The Figure readily shows that as soon as a deviation in the focussing occurs, a focussing measuring signal $S_f$ which is proportional to the magnitude and the direction of the deviation is produced. By way of illustration the Figure shows a sinusoidal variation F of the focussing and the resulting measuring signal $S_f$. This is a situation which is reasonably typical of the focussing deviations occurring in practice. When a disc-shaped record carrier is used the focussing deviations will mainly be caused by unevennesses of the record carrier, as a result of which the focussing deviations produced thereby will contain strong components having a frequency equal to the revolution frequency of the record carrier and harmonics thereof. In order to explain the operation of the apparatus in accordance with the invention it is therefore assumed for the sake of simplicity that there is a periodic disturbance F in the focussing.

In FIG. 2 the characteristic II represents the variation of the amplitude A of the information signal read as a function of the focussing error f. It is obvious that said amplitude is maximum if the scanning beam is in focus on the plane of the information structure and decreases outside said plane with increasing focussing error. The signal supplied by the read detector 12 generally comprises a d.c. component, corresponding to the average energy level of the radiation beam, and an a.c. component which is superimposed thereon and caused by the information stored in the record carrier. For obtaining the information signal said a.c. component is obviously extracted, for example by means of an a.c. coupling to the read detector. It is then evident that the amplitude A of the information signal is to be understood to mean the amplitude of said a.c. component. By way of illustration FIG. 1 represents the variation of said amplitude A for the disturbance F in the focussing.

It is obviously desirable for the focussing system to keep the scanning beam as well as possible in focus on the plane of the information structure, because the amplitude of the information signal read is then a maximum. However, there are various causes which make it very difficult to achieve this with the known focussing systems. Although this applies to all known focussing systems in a varying degree, this will be explained with the aid of the focussing system shown in FIG. 1.

As is set forth comprehensively in the U.S. Pat. No. 4,006,293, this focussing measuring system employs the two firstorder subbeams produced in the scanning beam by the information structure. By means of the detectors 13 and 14 the information contained in said subbeams with respect to the focussing error is detected. For a correct detection the detectors should be arranged at an exactly defined position relative to the scanning beam. If for example owing to manufacturing tolerances this position is not entirely correct, the focussing measuring signal produced by said detectors will not be entirely correct. The same occurs when the two detectors are not fully identical, i.e. have different transfer characteristics. A further error may be caused by an unbalance (offset) of the differential amplifier 18.

The influence of this type of errors on the focussing system may be represented by a shift of the characteristic I along the f-axis, for example resulting in the characteristic I' or I'' in FIG. 2. When it is assumed that the characteristic I' is valid, the focussing system will employ point O' as control point and point O'' for the characteristic I''. This means that if the characteristic I' or I'' obtains, said focussing system does not control towards an optimum focussing but towards a focussing at which a focussing error $\Delta f_1$ or $\Delta f_2$ occurs. It is then evident from the Figure that the amplitude A of the information signal read in either case is smaller than the maximum amplitude which is attainable, so that the signal-noise ratio of the information signal read has increased.

The invention enables such an incorrect setting of the focussing system to be compensated for in a simple manner. For this purpose the apparatus of FIG. 1 first of all comprises an amplitude detector 21, which is coupled to the read detector 12 for detecting the amplitude A of the information signal. Via a band-pass filter 22, which rejects undesired frequency components, the output of said amplitude detector 21 is connected to a first input 23a of a phase detector 23, which takes the form of a multiplying circuit. A second band-pass filter 24 receives the focussing measuring signal $S_f$ and its output is connected to a second input 23b of the multiplying circuit 23. Said multiplying circuit 23 multiplies the signals applied to its two inputs by each other and supplies the product signal to a low-pass filter 25. This low-pass filter 25 has such a small bandwidth that its output signal represents the average value of the product signal. The output of this low-pass filter is coupled to a difference stage 26, which subtracts the output signal of the low-pass filter 25 from the measuring signal $S_f$. Finally, the difference signal supplied by said difference stage 26 is applied to the drive means 17 as control signal.

In order to explain the operation of the apparatus in accordance with the invention reference is made to FIG. 3. In this Fig. the characteristic I again represents the desired variation of the measuring signal $S_f$ as a function of the focussing error f, and the characteristic II the variation of the amplitude A of the information signal being read as a function of said focussing error f.

It is assumed that as a result of a positional error of the detectors 13 and 14 and/or incorrect adjustments of the electronic circuits, the $S_f$-f characteristic I' obtains instead of the characteristic I. As a result of this the control point O' instead of the desired control point O will be pursued by the focussing system. Thus, without any further steps an average focussing error $\Delta f_1$ will occur.

The focussing will continually vary about the control point O', i.e. a focussing error signal will occur which controls the focussing control so as to reduce said focussing variation. As stated previously, this focussing error may be represented by a periodically varying deviation F for the sake of simplicity. Via the characteristic I' such a periodi deviation F about the control point O' results in a focussing error signal $S_f$ as is shown on the right in the Figure.

As a result of said focussing variation F about the control point O' the amplitude A of the information signal will also vary via the characteristic II as shown on the right in the Figure. This signal corresponds to the output signal of the amplitude detector 21. As can be seen in the Fig. the two signals $S_f$ and A are in phase opposition in this situation. This means that the product signal $A \cdot S_f$ supplied by the multiplying circuit 23 has a variation as is also shown on the right in FIG. 3. In this case said product signal $A \cdot S_f$ is always negative, so that the correction signal derived from said product signal by the low-pas filter 25, which correction signal substantially corresponds to the average of said product signal, is negative. This correction signal is subtracted from the measuring signal $S_f$ in the difference stage 26, which results in the control point of the focussing control being shifted from the position O' to the desired position O.

In a similar way as described in the foregoing for the situation that the $S_f$-f characteristic I' applies, FIG. 3 represents the situation if the characteristic I'' obtains, in which the normal focussing control pursues the incorrect control point O''. The variation of the focussing measuring signal $S_f$ and the amplitude A shown in the left-hand part of the Fig. reveals that in this situation the two signals are in phase. This means that the product signal $A \cdot S_f$ supplied by the multiplying circuit 23 is always positive, and hence the correction signal supplied to the difference stage 26. As a result of this the control point of the focussing control is shifted from the positive position O'' to the desired position O.

For the sake of completeness FIG. 2 further shows the product signal $A.S_f$ produced if the focussing control operates in the correct control point O. Said product signal then periodically varies about the value zero, so that the correction signal derived from said product signal is also zero.

Thus, with the electronic correction means which are schematically represented in FIG. 1 a correction in respect of an incorrect control point of the focussing control is obtained in a simple manner. In order to obtain the correction signal required for this purpose use is made of the datum that in the present focussing control the controlled quantity f exhibits variations (residual errors of the control system) which give rise to correlated variations of the measuring signal $S_f$ and the amplitude A of the information signal read. In order to increase the accuracy of the correction signal the most relevant frequencies, for example the revolution frequency of the disc-shaped record carrier, are filtered out of these two signals with the aid of the band-pass filters 22 and 24.

In order to further increase the accuracy of the correction which is performed it is possible to realize a periodic variation of the focussing in an active manner. For this purpose the apparatus of FIG. 1 may be provided with a signal source 27, which supplie a periodic signal of fixed frequency. This signal is applied to the focussing control device 17, for example via the difference stage 26, resulting in a periodic deviation in the focussing which corresponds to the variation F shown in FIGS. 2 and 3. Obviously the amplitude of this signal is to be selected so small that the maximum focussing deviations caused by said signal remain small enough to ensure an effective read-out of the information signal. In this embodiment the band-pass filters 22 and 24 will be tuned to the frequency of the signal supplied by the signal source 27. When a disc-shaped record carrier is used this frequency is preferably an odd multiple of half the revolution frequency of the record carrier. This is because said frequency can effectively be discriminated from the control signal which normally occurs in the focussing system, which as stated previously contains strong components having a frequency equal to said revolution frequency and integral multiples thereof.

When the signal source 27 is used for periodically varying the focussing it is also possible to apply the output signal of said signal source to the input 23b of the multiplying circuit 23 instead of the focussing measuring signal $S_f$, as in the embodiment of FIG. 1. The arrangement wherein the output signal of source 27 is applied to the input 23b of the phase detector 23 is shown in FIG. 5. The output of the source 27 can be used instead of signal $S_f$ because there is an unambiguous relationship, namely the $S_f$-f characteristic I, between this output signal of the signal source 27 and the focussing measuring signal $S_f$.

In the embodiment shown in FIG. 1 the correction signal $A.S_f$ which is generated is proportional to the magnitude of the deviation of the control point (O', O'') relative to the desired control point O of the focussing control, because the multiplying circuit 23 operates proportionally. However, this proportional action is not required for an effective correction. It suffices to detect whether the two input signals are in phase or in phase opposition, which enables very simple phase detectors to be used. FIG. 4 schematically shows an embodiment which is very simple in an electronic respect, only those elements being shown which are of interest. The amplitude signal A supplied the detector 21 is applied to a limiter circuit 30 via the band-pass filter 22, which circuit converts said amplitude signal A into a squarewave signal. In a similar way the measuring signal $S_f$ is converted into a squarewave signal by a limiter circuit 31. The two squarewave signals on the outputs of the limiter circuits 30 and 31 no longer contain any information in respect of the magnitude of the original signal, but only in respect of their polarities, and thus their mutual phase relationship. This relationship can be detected in a simple manner by means of an exclusive-OR gate 32. Indeed, if the two signals A and $S_f$ are in phase with each other, the output signal of the gate 32 will continuously have a value corresponding to a logic "0", whilst if these two signals are in phase opposition said output signal will continuously have a value corresponding to a logic "1". Consequently, this output signal of the gate 32 is suitable to realize the desired shift of the control point of the focussing control. This signal may then also be applied to the low-pass filter 25, as the case may be via an adapter circuit 33 for bringing the two signal values which are possible at a desired level.

FIG. 1 finally shows an extension of the apparatus in accordance with the invention, which extension takes the form of a detection circuit 28 and an interrupter switch 29 controlled by the circuit 28, which switch is included in the connection between the phase detector 23 and the low-pass filter 25. The purpose of this extension is to ensure that the correction system does not become operative until the conventional focussing control has reached its control point. This is because when the read apparatus is put into operation there will initially be a large focussing error. It is then undesirable that the correction system is already operative, because this will complicate locking in of the focussing control. The detection circuit 28 therefore keeps the connection between the phase detector and the low-pass filter 25 interrupted by means of the switch 29 until the focussing measuring signal (as the case may be the average focussing measuring signal) has decreased below a certain value, which is indicative of the control point being reached. Obviously an other possibility is to activate the correction system via the switch 29 with a fixed delay after the read apparatus is put into operation.

It is obvious that the invention is by no means limited to the embodiments shown in the Fig., but that on the basis of the inventive concept a multitude of alternative embodiments are possible. Furthermore the invention is by no means limited to an apparatus for reading a disc-shaped record carrier, but may on the contrary be employed in conjunction with any read system in which a scanning beam is to be focussed on an information track.

What is claimed is:

1. An apparatus for optically scanning a record carrier on which information is recorded, which apparatus is provided with a radiation source for emitting a scanning beam, a read detector for detecting the information contained in the scanning beam after cooperation with the record carrier and a focussing system for focussing the scanning beam on the record carrier, which focussing system comprises a focussing detector for supplying a focussing measuring signal which is representative of the extent to which the scanning beam is out of focus on the record carrier and a focussing control device for controlling the focussing of said scanning beam depending on the measuring signal, characterized in that the apparatus is furthermore provided with an amplitude detector, which is coupled to the read detector, for supplying an output signal which represents the amplitude of the information signal read, a phase detector having a first input for receiving a focussing error signal, a second input for receiving the output signal of the amplitude detector, and an output for supplying a correction signal having a polarity which depends on the phase relationship between the signals applied to the two inputs, and a difference stage for subtracting the measuring signal supplied by the focussing detector and the correction signal supplied by the phase detector from each other and applying the difference signal to the focussing control device.

2. An apparatus as claimed in claim 1, wherein the phase detector is constituted by a multiplying circuit which supplies the product of the signals applied to its two inputs as the correction signal.

3. An apparatus as claimed in claim 1, wherein the phase detector includes two converters for converting the focussing error signal and the output signal of the amplitude detector into two squarewave signals, and an exclusive-OR circuit having two inputs for receiving the two squarewave signals and an output for supplying the correction signal.

4. An apparatus as claimed in claim 1, 2 or 3, including a low-pass filter connected between the output of the phase detector and the difference stage.

5. An apparatus as claimed in claim 1, 2 or 3 including an interrupter switch connected between the output of the phase detector and the difference stage, and a control circuit coupled to the switch for maintaining the connection between the phase detector and the difference stage interrupted as long as the focussing system has not yet effected focussing.

6. An apparatus as claimed in claim 1, 2 or 3 wherein the focussing system includes a signal source for generating a periodic activating signal and means for applying said activating signal to the focussing control device for periodically varying the focussing.

7. An apparatus as claimed in claim 6, wherein the first input of the phase detector for receiving the focussing error signal is coupled to the signal source.

8. An apparatus as claimed in claim 6 wherein the record carrier is a rotatable disc and the activating signal has a frequency equal to an odd multiple of half the revolution frequency of the record carrier.

9. An apparatus as claimed in claim 1, 2 or 3, wherein the first input of the phase detector for receiving the focussing error signal is coupled to the focussing detector.

* * * * *